US008744501B2

(12) United States Patent
Jemison et al.

(10) Patent No.: US 8,744,501 B2
(45) Date of Patent: Jun. 3, 2014

(54) SYSTEM AND METHOD FOR SERVICE INVOCATION AND RESPONSE WITH A COMMUNICATION DEVICE BASED ON TRANSMITTED CODE CONTENT RECOGNITION

(71) Applicants: Timothy Jemison, Palo Alto, CA (US); Gerald T. Christensen, Sequim, WA (US)

(72) Inventors: Timothy Jemison, Palo Alto, CA (US); Gerald T. Christensen, Sequim, WA (US)

(73) Assignee: Zoove Corp., Palo Alto, CA (US)

(*) Notice: Subject to any disclaimer, the term of this patent is extended or adjusted under 35 U.S.C. 154(b) by 0 days.

(21) Appl. No.: 13/943,233

(22) Filed: Jul. 16, 2013

(65) Prior Publication Data

US 2013/0303137 A1 Nov. 14, 2013

Related U.S. Application Data

(63) Continuation of application No. 11/891,853, filed on Aug. 13, 2007, which is a continuation-in-part of application No. 10/400,196, filed on Mar. 26, 2003, now Pat. No. 7,257,391.

(60) Provisional application No. 60/367,606, filed on Mar. 26, 2002.

(51) Int. Cl.
*H04W 4/00* (2009.01)

(52) U.S. Cl.
USPC ..... 455/466; 455/414.1; 455/418; 455/426.1; 455/426.2; 455/432.3; 370/338; 379/201.02; 379/207.02; 379/221.14; 379/242; 379/350; 705/14.4; 705/77

(58) Field of Classification Search
USPC .............. 455/466, 410, 405, 401, 414.1, 418, 455/426.1, 426.2, 432.3; 370/328–338; 379/93.01, 114.13, 142.04, 201.02, 379/207.02, 221.14, 242, 350; 705/14.4, 77
See application file for complete search history.

(56) References Cited

U.S. PATENT DOCUMENTS

| 5,418,844 | A | * | 5/1995 | Morrisey et al. ......... 379/221.09 |
| 5,752,186 | A | * | 5/1998 | Malackowski et al. .... 455/414.1 |
| 6,029,065 | A | * | 2/2000 | Shah ......................... 455/414.4 |
| 6,304,753 | B1 | * | 10/2001 | Hartmaier ................... 455/413 |

* cited by examiner

*Primary Examiner* — Quan M Hua
(74) *Attorney, Agent, or Firm* — Bingham McCutchen LLP (57) ABSTRACT

A system and method for enabling a user to invoke a service over a signaling channel in a communication system with a communication device such as a mobile phone. The user dials a series of digits into their phone and enters them into the disclosed system, for example by pressing the send key on a mobile phone. The digits entered by the user include a prefix or routing code, and a data code. The dialed digits are transferred to a call switching system, which determines, based on the prefix code, a processing system to which a message is sent. The processing system further determines, based on the data code of the dialed digits, the service to provide and how the service should be fulfilled. The service can be fulfilled by content over the signaling channel or a transport channel, or both.

12 Claims, 4 Drawing Sheets

SYSTEM AND METHOD FOR SERVICE INVOCATION AND RESPONSE WITH A COMMUNICATION DEVICE BASED ON TRANSMITTED CODE CONTENT RECOGNITION

CROSS REFERENCE TO RELATED APPLICATIONS

The present application is a continuation of U.S. patent application Ser. No. 11/891,853, filed Aug. 13, 2007, which is a continuation-in-part application of U.S. application Ser. No. 10/400,196, filed Mar. 26, 2003, now U.S. Pat. No. 7,257,391, which claims priority benefit of U.S. Provisional Application No. 60/367,606, entitled WIRELESS DATA SYSTEM, filed Mar. 26, 2002, the whole of which are each hereby incorporated by reference herein.

STATEMENT REGARDING FEDERALLY SPONSORED RESEARCH OR DEVELOPMENT

N/A

BACKGROUND OF THE INVENTION

The present invention relates generally to service invocation in a communication system, and relates more specifically to a system and method to permit a user to invoke a service and receive content over a signaling channel with a communication device in a communication system.

Marketers of various types of goods and services often seek media vehicles to communicate product information to potential customers. Great efforts have been made to provide product information in ways that are effective, in terms of who the information is provided to, and the nature of the information provided. The difference between effective and ineffective product marketing campaigns often hinges on the specific advertising techniques used.

Various specific forms of advertising are currently in use, including television, radio, print, on-line and billboard advertising. In many cases, the people exposed to a given advertisement have differing degrees of interest in the product or service being advertised. For example, some of the people that see a billboard advertising a certain product might be completely uninterested in buying the advertised product, while others might become interested in obtaining more information about the product.

In existing advertising approaches, when a potential customer desires further information regarding an advertised product, they take some sort of affirmative step to obtain such information. The step might be calling a toll-free "800" telephone number given in the advertising itself, sending a text message to a given address or entering a URL web address in an internet browser on a wireless PDA or on their PC at home. However, such approaches are often inconvenient, since, in the case of a telephone call, time to take down or memorize a telephone number is often limited. In addition, the telephone call may involve a voice conversation during which the user generally takes down or remembers more information about the product. The time at which the advertisement is seen or heard may not be a time when the potential customer can conveniently place the telephone call. Additionally, if sufficient time passes after a toll-free telephone number is seen (and possibly recorded by the customer in some way), the potential customer may forget about it completely, and the call may never be placed.

Other advertised sources of additional product information, such as websites, suffer from similar problems, since advertised website addresses call on the potential customer to maintain interest in the product after exposure to the initial advertisement until a later point in time when the additional information can be expressly obtained. Having the potential customer remember long and complex URLs for websites after the initial advertising exposure has proven to be problematic for advertisers. The point of maximum influence from the advertiser's perspective is in the initial few seconds after the advertisement has been seen by the consumer. This is the so called "emotional connection" period and is the point when calls to action are most likely to elicit a response. Moreover, these existing techniques for providing additional product information cannot provide information tailored to an individual requester, since usually a single "800" number or website is, at least initially, accessed by all potential customers.

The increasing use and availability of mobile telephones, referred to also as cell, phones and/or wireless phones, as well as wireless PDA, pagers, or other wireless communication devices makes it more convenient for a potential customer to immediately dial an "800" number for additional information regarding an advertised product. However, the time required to obtain information in a voice conversation may still be a deterrent to many people making a call at the time they see the advertisement, since they are often busy driving or performing some other activity that makes dialing a number or conducting a lengthy phone call impractical or inconvenient, especially during the emotional connection period. Moreover, a potential consumer viewing an advertisement may not have a practical way to record information obtained during a phone call that they could refer to later.

For these reasons and others, it would be desirable to have a system for providing product information to potential customers that desire the information where the potential customer is not required to remember and dial a telephone number or remember and enter a website URL address. In addition, it would be desirable to avoid exposing the potential customer to a voice based conversation to request or receive product information or cause the user to be connected to a potentially confusing IVR (Interactive Voice Response) Automated Attendant phone system, or to urge the user to enter a URL into a web enabled phone, for example. The system should facilitate the provision of personalized product information to potential customers, and minimize the resources used to provide such information, such as telephone system bandwidth. Additionally, the system should be convenient to set up for a given advertiser and/or product, and minimize the time required of the potential customer to request the information.

BRIEF SUMMARY OF THE INVENTION

The presently disclosed invention enables users of communication devices in a communication network to invoke a service and/or obtain service fulfillment over a signaling channel, a bearer channel, or both. A bearer channel is a channel that carries content information, such as voice communication or data content. In an exemplary embodiment of the disclosed system, a component of the communication network forwards specially recognized code information provided by a user through a communication device, such as a telephone. A data service coupled to the communication network receives the code information transmitted over a signaling channel and processes the same to determine whether or what service is invoked. If a service is invoked based on the code information provided by the user, the data service determines how service fulfillment is to be accomplished. For example, the service fulfillment may be delivery of product information to the communication device or another device, registering a vote in voting or polling activities, causing an article or other publications to be reprinted, selection and purchase of a magazine subscription, music download or sharing information with other users. The service invocation and fulfillment should not be considered to be limited to the above examples, but can be employed to request and receive any type of service for which the system is configured. The service invocation and fulfillment system also permits selection of service delivery options, for example.

Entry of the input sequence may take on any form available in the communication device, such as keying characters or symbols into a cell phone and pressing the send key, for example. In one embodiment, the symbols or codes are not a traditional phone number under the standard 10 digit North American Numbering Plan (NANP) format, of NPA-NXX-XXXX. The symbols or codes entered by the user include a first set of symbols referred to as a prefix or routing code, and a second set of symbols referred to as a data code. The prefix can be any type of input sequence to the communication device that can be set aside to indicate that the subsequent input sequence is a data code or multi-function code. For example, "**" (star, star) may be used as a prefix that is followed by a data code. The prefix triggers the system to recognize a service invocation.

The entered symbols are transferred to a call switching system through a signaling channel, which determines that the prefix code indicates a non-standard call or service invocation, causing the call switching system to suspend call processing and send a signal to the data service for further processing. The call switching system further converts the prefix code to an indication or address of a data service processing system that is pre-configured to handle the call.

The call is then routed to the data service processing system, by way of a signaling channel message including the originally entered symbols. The data service processing system then processes the call to determine the service invoked and fulfills the service in accordance with the configuration of the data service processing system. In an exemplary embodiment, the data service processing system provides a service fulfillment by responding to the communication device with information over the signaling channel. The information provided over the signaling channel may take on a number of forms including an SMDPPSMS message or a display text response. Accordingly, the use of the signaling channel permits a real time processing and response for service invocation and fulfillment.

In accordance with another exemplary embodiment, the data service processing system uses decision logic to determine which channels, the signaling channel or transport channel, or both, to use for service fulfillment. The data service processing system may choose to respond to the service invocation using the signaling channel, if the service fulfillment is so configured. The service fulfillment configuration in the data service processing system may also be configured to use the transport channel, indicating that the service invocation is fulfilled with a voice call response, an SMS response, or any other type of transport channel response to the service invocation. Furthermore, the decision logic may indicate the use of the signaling channel and the transport channel for service fulfillment, so that the communication device can receive control information in the signaling channel and voice or data communication through the transport channel to obtain service fulfillment based on the service identified by the data code. By having the ability to provide service fulfillment over the signaling channel, the transport channel or both, the data service processing system can provide an optimal path for response for service fulfillment, depending upon the configuration of the invoked service and fulfillment. For example, the response may include selection of content delivered, and delivery path. The content delivered can be selected to be data, voice or both. For example, the communication device may receive SMS, MMS, WAP Push and/or be connected to a voice channel to receive audio content, speak with another person, or otherwise interact with a service fulfillment using a voice channel.

The decision logic used by the data service processing system may be based on one or more of various rules, or combinations of the rules. For example, the data service processing system may implement a global rule that impacts the decision logic for providing any type of particular service fulfillment. An end user may also indicate preferences, which are implemented in the form of rules in the decision logic to permit service fulfillment in accordance with the end user preferences. When the service fulfillment is related to a campaign or event, for example, the decision logic can include rules related to a single campaign or event, a campaign or event provider or promoter for a number of campaigns or events, or a characterized type of campaign or event, such as a campaign or event that a user requests interaction with, or any user that requests a particular type of service. In addition, the decision logic can be influenced by information provided by the communication device, such as location upon invocation of a service, communication device type, or any other type of information tending to characterize how and what service fulfillment should take place.

According to another exemplary embodiment, the call switching system is reconfigured, or provisioned, to recognize the prefix and transfer the data code to the data service processing system. The provisioning of the call switching system can occur a single time, where components of the call switching system, such as communication switches, are configured to recognize the prefix. A number of data codes may be provided in conjunction with the prefix, so that a variety of service invocations may be implemented with different codes, and using a single prefix. The provisioning of the call switching system to recognize the prefix code can be achieved with a single configuration of the communication switches, thereby avoiding a provisioning step for each different type of data code.

In accordance with another exemplary embodiment, a user need not register with the data service processing system to invoke a service and receive service fulfillment. The service invocation and fulfillment can be made available on a global basis, so that any user entering the prefix code and desired data code in a communication device can invoke a service. Similarly, a user need not subscribe to the data service processing system to receive certain types of subscription related services, which can be made available on a global basis. In addition, a user can register or subscribe with the data service processing system to receive additional advantages with respect to service invocation and fulfillment, such as customized invocation and fulfillment.

In accordance with one exemplary embodiment, a user account is established that provides information regarding user registration, user subscription, user preferences or user devices. The data service processing system can, based on the identification of the phone or user that placed the call, determine whether there is a previously established user account associated with the caller. If not, then the processing system can send a message to the switching system requesting that the call be transferred via a voice connection to a call center, through which the user can establish an account. Otherwise, if there is a previously established user account associated with the communication device through which the call was placed, then the data code obtained from the entered digits is used to identify the service that is to be provided, and the user account associated with the communication device is used to determine an information delivery technique.

In another exemplary embodiment, the user account defines the information delivery technique as an electronic mail address associated with the communication device that made the call. The service fulfillment, such as delivery of product information associated with the data code, is achieved with an electronic mail message to that electronic mail address. Other delivery techniques might, for example, include a fax machine number to which a fax message containing the product information is to be sent, an SMS (Short Message Service) text message, a WAP (Wireless Application Protocol) push, or traditional postal system mail. A confirmation signal may be provided to the caller indicating that the transaction has been successfully completed, and the associated product information will be or has been sent. The confirmation signal may be sent on a signaling channel, a transport channel or both.

The disclosed system advantageously handles requests for information from users without the need for establishing a voice connection, and also allows users to be connected to a voice connection with a call center to optionally establish an account, for example. The disclosed system also permits a user to initiate a request with any interface in a communication device, including the standard 12 digit keypad of a mobile phone for example. Further, the system can operate in the absence of mobile phone interfaces/protocols, such as WAP, SMS or iMode. For example, the user dials and sends the desired digits on a mobile phone to invoke a service, and the disclosed system processes the request in the network, rather than in the communication device. The requested service is identified by the data code in the dialed digits and for a user having previously established an account, the service fulfillment can be achieved based on information in the account, without requiring further action by the user. In one embodiment, successful service fulfillment causes the user to be automatically notified that the request has been satisfied by a signal such as a special beep, voice confirmation, or customized response (voice or beep, etc.) based on the user's account information. The disclosed system may be operated from any type of communication device that can communicate with the call switching system, and does not require new hardware within the telephone carrier's network. Once the prefix code is configured into the call switching system, services associated with specific data codes can be managed external to the call switching system, such as with the data service processing system. If a user has an active account, there is no need for the user to reenter personal preferences or contact information, for example, each time they request a service invocation. Service fulfillment can be significantly enhanced and provide richer content when the communication device type known through parameters associated with the user account, and the user preferences for content format or display are known. By knowing the device type and preferences for content, they service fulfillment can take advantage of features in the communication device that are not necessarily available for users without an established account. Because account users in accordance with the disclosed system and method do not depend on mobile phone interfaces/protocols to receive content, the content presentation is enhanced over that which can be provided to mobile phone users over existing SMS (Short Message Service) systems, which are limited by a small screen size and the limited user interface available through the phone/handset. Additionally, the user's electronic mail address or any other kind of contact information need not be transferred to the service provider for service fulfillment, thus preserving the user's privacy. A proxy address may be provided by the data service processing system to the service provider to support ongoing marketing efforts directed to the user, for example, and the use of a proxy address prevents the user's actual electronic mail address from being known to the service provider. Such a configuration can avoid a user's email address being sold or used unscrupulously by the service provider or other parties. Moreover, the user's actual identity need not be shared with the service provider.

Thus there is disclosed a system and method for providing services to users by implementing a data code recognition mechanism in a communication network, where data code information is transmitted in a signaling channel for service invocation. Service fulfillment can be obtained through the signaling channel, a transport channel, or both to provide a number of options for service fulfillment and content delivery. The disclosed system and method provides a significant improvement over prior systems that have the user dial a toll free telephone number to obtain the information through a voice based conversation or other type of voice connection such as provided through IVR/Automated phone system services. The disclosed system also facilitates the provision of personalized content to users, whether a user account is established or not, and minimizes the resources used to provide such content. The disclosed system is convenient to set up for a given service provider, such as an advertiser and/or product seller/distributor, and minimizes the time used to request the desired information. The types of service fulfillment that can be implemented in accordance with the presently disclosed system and method are numerous, and include conveying information to a user, or to an application, including applications that involve other individuals, such as social networking systems.

BRIEF DESCRIPTION OF THE SEVERAL VIEWS OF THE DRAWING

The disclosed system and method is described in greater detail below with reference to the detailed description in conjunction with the accompanying drawings, of which.

DETAILED DESCRIPTION OF THE INVENTION

All disclosures of utility patent application Ser. No. 10/400,196, filed Mar. 26, 2003, entitled WIRELESS DAT SYSTEM, and provisional patent application Ser. No. 60/367,606, entitled WIRELESS DATA SYSTEM, filed Mar. 26, 2002, are hereby incorporated by reference herein.

Figure 1:
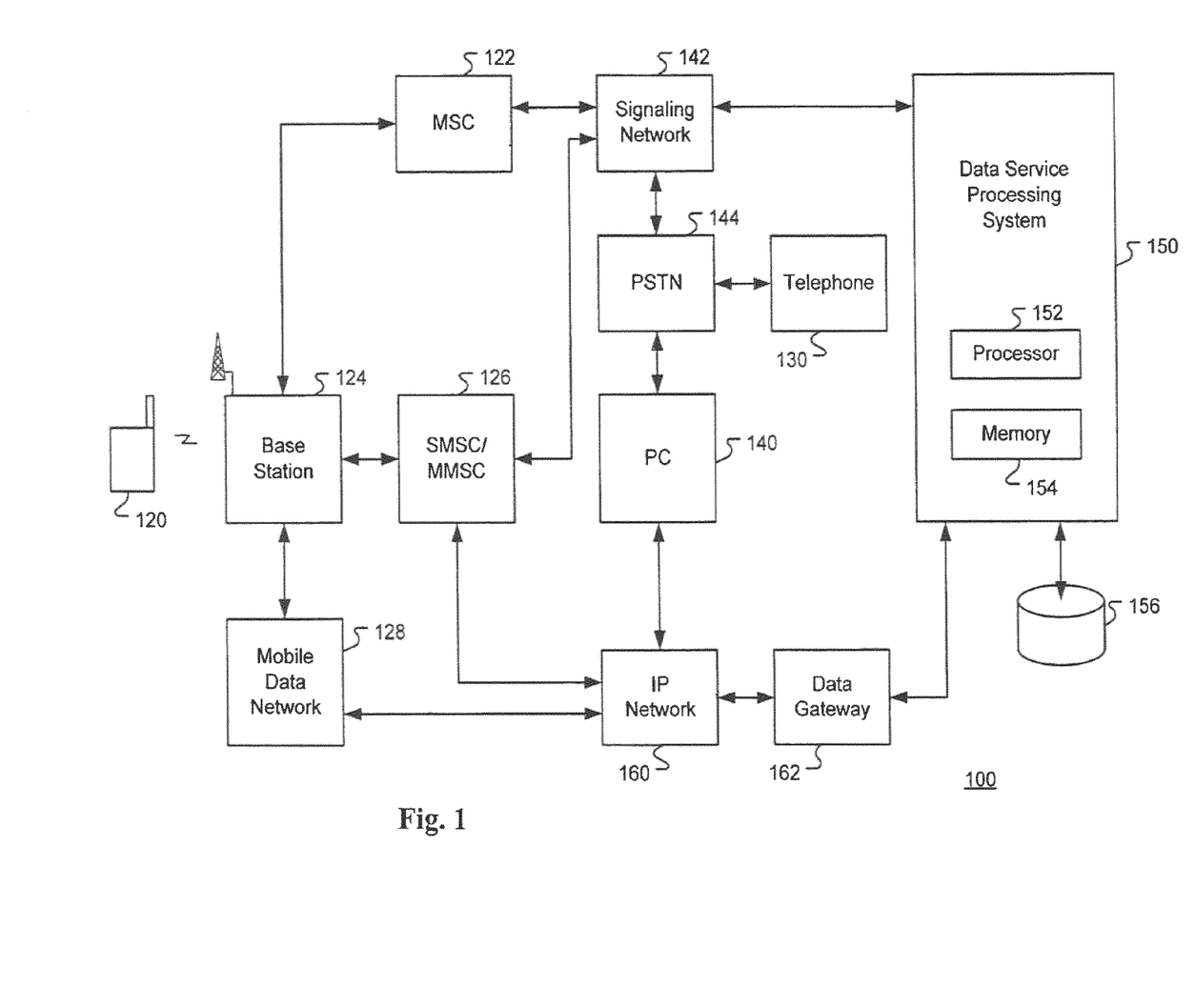
FIG. 1 is a communication network diagram illustrating an exemplary embodiment of the disclosed system.

Referring now to FIG. 1, a communication system 100 for use with a mobile communication device 120, a land line telephone 130 or a personal computer (PC) 140 is illustrated. Device 120, telephone 130 and PC 140 can communicate with each other through a variety of paths in communication system 100, and can also communicate with data service processing system 150. Communication system 100 includes a mobile switch center (MSC) 122 coupled to signaling network 142 and a base station 124 for connecting voice calls from device 120 to a publicly switched telephone network (PSTN) 144. Signaling network 142 provides signaling and control for a switched portion of communication system 100 that transports voice and SMS data, for example. In addition, device 120 can communicate using IP addresses, short code identifiers or other types of codes, including those used in accordance with the present invention.

base station 124 handles communication to and from device 120 through the use of various antennas, transceivers and other equipment for wireless communication. Device 120 can communicate using voice communication, text message, such as SMS text messages, multimedia message service (MMS), instant messaging (IM), email or other types of data session communication. Voice communications are handled with MSC 122, while text messages are handled through an SMS center (SMSC) or a multimedia message service center (MMSC) 126. Data transmissions are conveyed through mobile data network (MDN) 128. In accordance with the disclosed system and method, data codes provided by device 120 passed through base station 124 to MSC 122, which recognizes the data code to suspend call processing. Recognized data codes are forwarded through signaling network 142 to system 150 for further data code processing.

Alternately, or in addition, SMS or MMS messages are provided from device 120 through base station 124 to message center 126, and forwarded through signaling network 142 to system 150 for further processing. Data sessions established with device 120 are similarly processed through base station 124 and mobile data network 128. Data session communications are forwarded through IP network 160 and data gateway 162 to arrive at system 150 for further data code processing. Accordingly, wireless communication device 120 can provide data code information to data service processing system 150 through a variety of paths, and receive messages and service fulfillment through a variety of paths, including signaling network 142 and IP network 160.

In similar fashion, PC 140 can send data code information through PSTN 141 and signaling network 142 for further data service processing by system 150. PC 140 can also receive messages or other service fulfillment signaling network 142, or IP network 160, such as through email, IM or other transport channels.

Telephone 130 also sends and receives information through PSTN 144, connected to signaling network 142. Accordingly, user of telephone 130 can enter data code information preceded by a data code prefix, so that the data code is recognized and forwarded through signaling network 142 to system 150 for further data code processing.

Data service processing system 150 includes the appropriate mechanisms for receiving data codes, storing user accounts and subscriber lists, comparing data codes against services configured for invocation with the corresponding data codes as well as service fulfillment mechanisms. System 150 includes a processor 152 and memory 154 that contribute to data code processing and service fulfillment. A service provider source 156, which can be in the form of a database, for example, provides service configurations that can be associated with a data code to permit invocation of the given service. Service source 156 can be modified to add or remove service configurations in accordance with the disclosed system and method. System 150 obtains available service fulfillment from source 156, and decides how service may be fulfilled based on the service invoked by the associated data code. For example, a data code may be provided from device 120 that is routed through base station 124, MSC 122 and signaling network 142 to provide a data code to system 150. System 150 compares the code against the services for which system 150 is configured based on source 156 and determines how to procure service fulfillment. In accordance with an exemplary embodiment, system 150 provides messaging through signaling network 142, MSC 122 and base station 124 to provide the user of device 120 with information in the form of a displayed text response or SMDPP SMS message, for example, using the signaling channel available through signaling network 142. In addition, or alternately, system 150 can provide a trigger for a telephone call to be made to device 120 through PSTN 144. The user of device 120 may also receive information through a data channel—, such as through SMS over IP through IP network 160. Other types of service fulfillment can be achieved without interacting with device 120, such as through mailing, emailings, facsimile transmission or scheduled interactions, such as appointments for other services.

Figure 2:
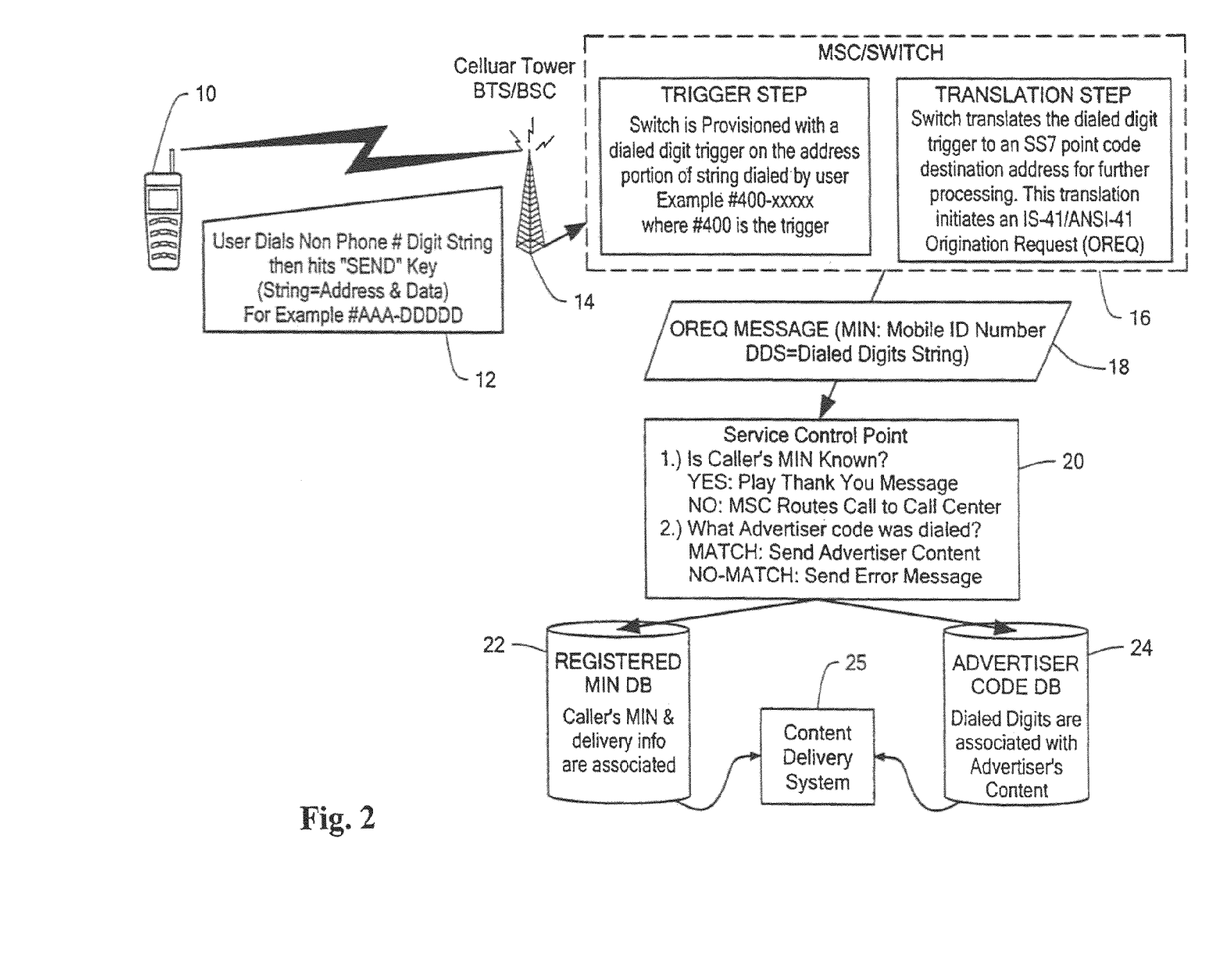
FIG. 2 is a flow diagram illustrating system operation in accordance with an exemplary embodiment of the disclosed system.

FIG. 2 shows another exemplary embodiment of the disclosed system, in which a mobile telephone user requests product information via a mobile phone. As shown in FIG. 2, a user of a mobile phone 10 dials 12 a string of digits that is a non-telephone number, followed by the "SEND" key, or presses some other key, or performs some other action, as may be required to submit the dialed digits. The disclosed system may be embodied, for example, such that a predetermined button is dedicated within the phone or mobile phone interface for accessing the disclosed system or similar systems to obtain product information. For example, the string of digits dialed by the user may include a first portion referred to as a prefix code or address part, as well as a second portion referred to as a data code or advertiser code. The dialed digit string entered by the mobile phone user may be obtained by the user through a variety of techniques, such as placement within some form of advertisement for a related product and/or service. The advertisement may appear in any manner of media such as print (Magazine/Newspaper), TV/radio, direct mail or outdoor/indoor billboard advertising, and/or Internet based or other type of electronic advertising. For example, there are many kiosks, elevators, gas stations etc. that offer advertising that may not allow direct interactivity, but which can provide the dialed digit string. The product information obtained using the disclosed system thus may be information related to a product or service described in such advertisements.

Those skilled in the art will recognize that while the embodiments provided herein are described with regard to the use of mobile phones to enter the dialed digits, the disclosed system is not so limited. Accordingly, the dialed digits including the prefix and data codes may alternatively be provided through standard land line telephones.

The dialed digit string is then transferred from the mobile phone 10 to a cellular tower 14, and forwarded from the cellular tower 14 to a mobile switching center (MSC) 16. As will be apparent to those skilled in the art, the switching center 16 may include one or more processors and associated software and/or firmware, as well as program storage devices for storing such software and/or firmware, various input/output interfaces, and customized, application specific hardware circuitry. The switching center 16 operates to perform a trigger step, which determines special processing that is to be performed in response to the prefix code within the dialed digit string. In this regard, the switching center 16 is provisioned with a dialed digit trigger associated with dialed digit strings including the predetermined prefix code, for example #400. When a call is received by the switching center 16 that includes the predetermined prefix code, in this case #400, within the dialed digit string of the call, the switching center 16 performs a translation step in which the switching center 16 determines a point code destination address for further processing of the call. The translation step identifies an SS7 network point referred to as an SCP (Service Control Point). The SCP is reached via an SS7 addressing scheme called point codes, similar in nature to IP addresses on the Internet. Using the point code destination address determined in this way, the switching center 16 initiates a request message to be sent to a system that is responsible for further processing of the call. For example, the request message may consist of an IS-41/ANSI-41 Origination Request (OREQ) message. While in the case of a CDMA type intelligent network, an OREQ message may be used, alternatively, an equivalent message may be used within a GSM-MAP (Global Systems For Mobile Communication—Mobile Application Part) system using the CAMEL (Customized Applications for Mobile Enhanced Logic) application protocol. As shown in FIG. 1, the request message 18 may, for example, be an OREQ message including a number of parameters, including a MIN (Mobile Identification Number) that identifies the mobile phone from which the call placed, as well as a DDS (Dialed Digits String) parameter storing the dialed digits entered by the user.

The request message 18 transmitted by the switching center 16 is received by the SCP (Service Control Point) system 20. The SCP 20 may include one or more server computer systems, each of which may include one or more processors and associated software and/or firmware, as well as program storage devices for storing such software and/or firmware, various input/output interfaces, and customized, application specific hardware circuitry. The SCP 20 processes the received request message 18 by first determining whether the MIN in the request message is associated with a previously established user account. If so, then the MIN is considered a known MIN, and the SCP 20 causes a "Thank You" message to be played back to the user indicating that the request for product information will be processed. Such a "Thank You" message may, for example, be provided completely through the signaling mechanisms of the underlying 557 network, and does not require establishment of a voice connection. However, alternatively, a voice connection to an IVR (Interactive Voice Response) system may be used to provide a "Thank You" message to the user indicating that the request has been satisfied. Moreover, some other kind of signal may be used in this regard, such as a beep or tone provided to the user indicating completion of the request.

In the case where the MIN in the request message 18 is not associated with a user account that has previously been established, the SCP 20 operates to route the call to a call center via a voice connection, through which a call center operator can obtain information from the caller with which a user account can be established for the caller. Such information may include, for example, a delivery technique to be associated with the caller, such as an electronic mail (e-mail) address. As shown in FIG. 1, a Registered MIN Database 22 is used to store user account information, and to associated MINs with corresponding user accounts.

Further within the service SCP 20, a determination is made as to the specific product information or other action that is associated with the data code within the dialed digits string included in the request message. For purposes of illustration, the data code within the dialed digits string may be associated with a specific corresponding portion of advertiser's content, and thus the data code may also be referred to as an "advertiser code" within the dialed digits string. As shown in FIG. 2, an Advertiser Code Database 24 may be used to associate data codes with specific product information, such as advertiser provided content. In the event that the SCP 20 determines that there is product information associated with the data code in the dialed digits string, then the SCP 2 0 sends the product information to the user that dialed the call through the content delivery system (CDS) 25 using a delivery technique indicated by the information in the user account associated with the MIN in the request message 18. For example, the information stored in a user account may indicate that the delivery technique to be used to deliver the product information associated with the data part of the dialed digits string is electronic mail, and further include an electronic mail address to be used as a destination address to deliver the product information to the user. Other delivery techniques may include facsimile delivery, in which case the user account may include a facsimile machine number that is to be called for the delivery of the product information. Additionally, the delivery technique may be SMS (Short Message Service), in which case the product information stored in the Advertiser Code Database consists of a text message to be delivered back to the mobile phone on which the original call was placed using the SMS protocol. Other examples of delivery techniques that may be used include a WAP (Wireless Application Protocol) push, or a MMS (Multi-media Messaging Service) message, or an EMS (Enhanced Messaging Service) message, or some other appropriate delivery technique.

FIG. 2 illustrates a first example of operation of an embodiment of the disclosed system. As shown in FIG. 2, the user dials 12 a dialed digit string including a prefix code such as #400, and also a data code, shown for purposes of illustration as a set of 1-5 digits following the prefix code. The length of the data code may vary across different embodiments, for example between 1 and 12 digits. An MSC switching center 16 receives the call, and determines 17 based on the prefix code in the dialed digit string that a dialed digit trigger is to be invoked on the switching center 16, which translates the prefix code into a point code indicating an SS7 network destination such as a service control point. As a result, a request message, such as an OREQ message 18, including the mobile identification number (MIN) of the mobile phone used to place the call, as well as the full dialed digit string entered into the mobile phone by the user, is sent across the SS7 network 30 to the SOP 20. An SOP server system 20*a* then issues a database query 32 to a known subscriber database 20*b* within the SOP 20, which validates the MIN in the OREQ message 18 against, the set of MINs that are associated with existing user accounts. The known subscriber database 20*b* then determines whether the MIN in the OREQ message 18 is associated with an existing subscriber account. For purposes of explanation, as shown in FIG. 2, the database 20*b* determines 34 that the MIN in the OREQ message 18 is recognized as being associated with a registered user. Accordingly, the MIN and the dialed digits string from the OREQ message 18 are sent 38 to a content delivery system (CDS) 20*c*, that includes an e-mail server. As will be apparent to those skilled in the art, the SOP server 20*a*, known subscriber database 20*b*, and CDS system 20*c* may each include one or more processors and associated software and/or firmware, as well as program storage devices for storing such software and/or firmware, various input/output interfaces, and customized, application specific hardware circuitry.

In response to the MIN and digits dialed string sent to the CDS system 20*c*, the CDS system 20*c* operates to match 40 the data code within the dialed digit string with product information content that is to be delivered to the user. The CDS system 20c then sends 42 an e-mail message over a TCP/IP Network 44, such as the World Wide Web, to the e-mail address associated with the user's account. Thus an e-mail message delivers product information, including any appropriate or suitable content, including HTML (HyperText Mark-up Language) or other content types, to the user's personal computer (PC) 46.

Further in response to the determination 34 that the MIN in the OREQ message 18 is associated with an established user account, the database 20b sends a success message 36 to the SOP server 20a. The SCP server 20a then sends a message 48 to the switching center 16 indicating that the request for product information has been successful. The message 48 may, for example consist of a Origination Request (OREQ) message requesting the switching center 16 to transfer the call to an IVR (Interactive Voice Response) system which plays a "Thank You" message 50, or that provides some other kind of indication that the information request has been processed. The call is then automatically disconnected 52, after using only a few seconds of the network's airtime to complete the requested transaction.

Figure 3:
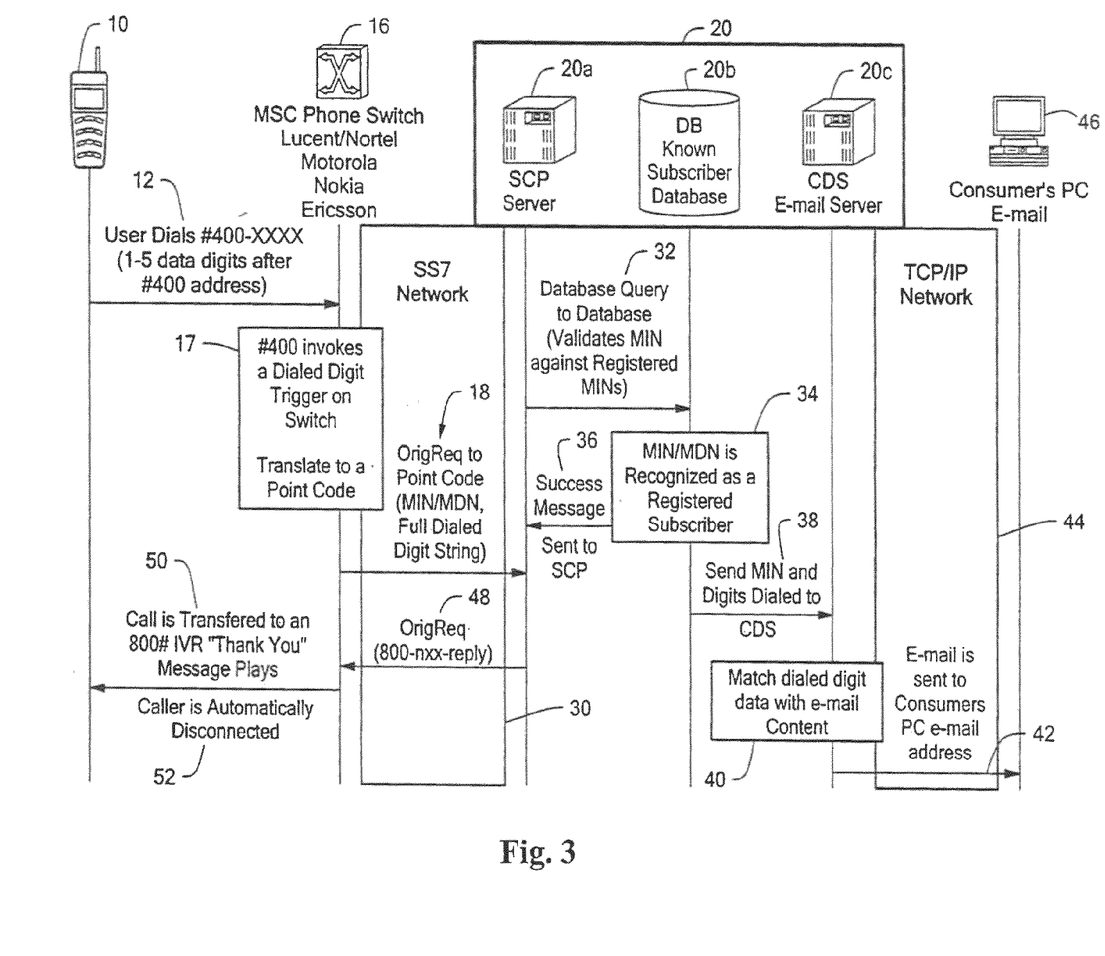
FIG. 3 is a call flow diagram illustrating operation of an exemplary embodiment of the disclosed system.
Figure 4:
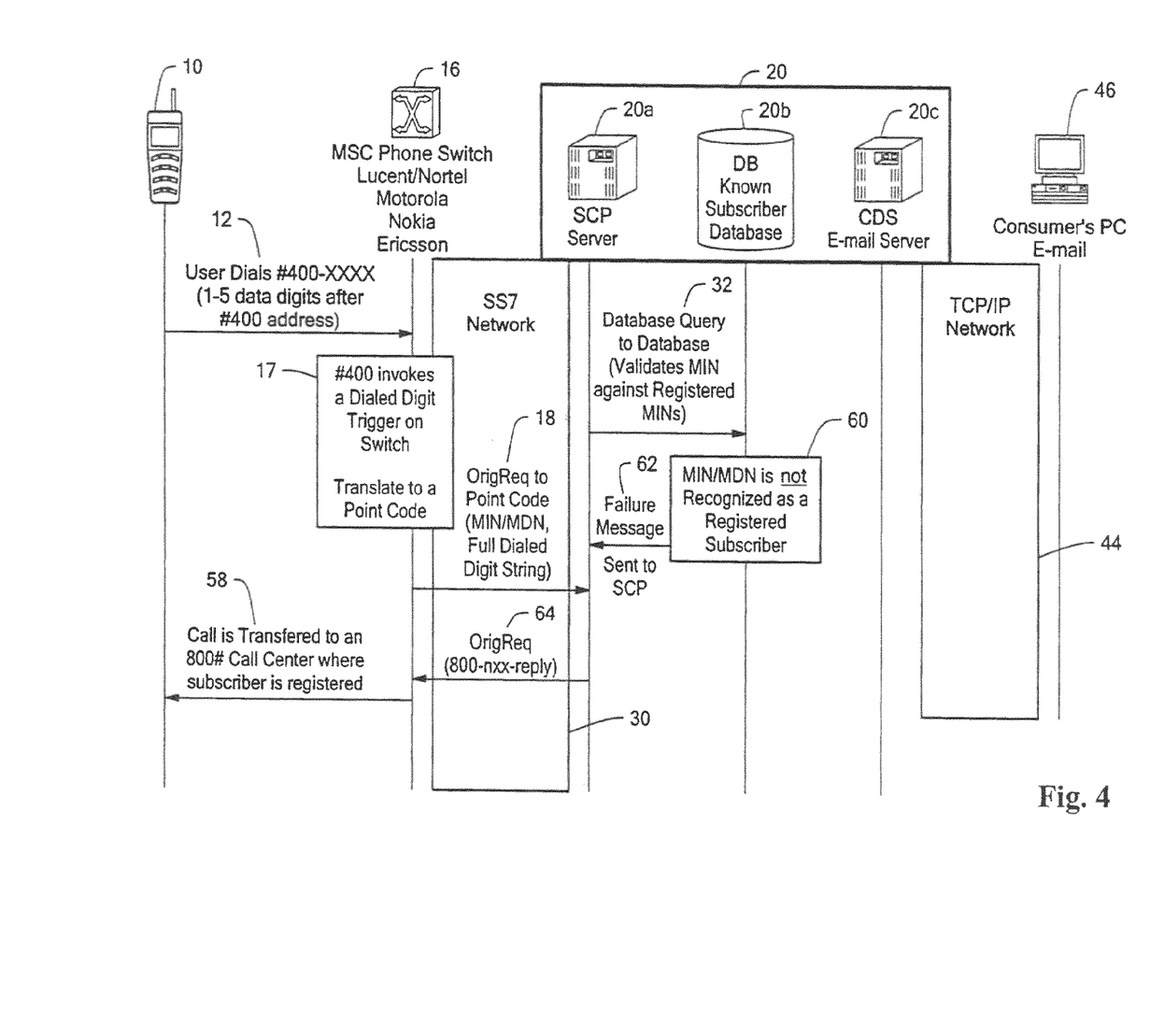
FIG. 4 is a call flow diagram illustrating operation of another exemplary embodiment of the disclosed system.

FIG. 3 illustrates another example of operation of an embodiment of the disclosed system. As shown in FIG. 3, the user dials the prefix code (for example #400), followed by the data code (for example 1-5 digits following the prefix code) on their mobile phone 10, and hits the send key. The call is received by the switching center 16, which invokes 17 a dialed digit trigger to translate the prefix code of the dialed digits string to a point code. The switching center 16 then sends a request message (shown for purposes of illustration as an OREQ message) across the SS7 network 30 to the SCP 20, at which the request message 18 is received by the SCP server 20a. The SCP server 20a then sends a database query 32 to the known database subscriber database 20b, which determines whether the MIN in the request message 18 is associated with an established user account. For purposes of explanation, FIG. 3 illustrates the case where the database 20b indicates that the MIN in the request message 18 is not associated with an established user account. Accordingly, a failure message 62 is sent to the SCP server 20a, which then sends a message 64 indicating that the product information request has failed. The message 64 is shown for purposes of illustration as an OREQ message that will transfer 58 the call to a call center where information can be obtained from the user to establish a new account. Alternatively, an SMS text message may be generated and sent requesting that the user to reply with their e-mail address, in lieu of connection to the call center in the case where a determination is made that the user has SMS capability.

Thus there is disclosed a system and method by which a user can enter into their cellular or landline phone, a series of digits from an advertisement as a method for the potential consumer obtain additional information. The potential applications of the disclosed system are many and varied, and include allowing the user to request additional information about a particular product or service, participate in voting or polling activities, reprint an article or other publication, request and authorize a purchase of a magazine subscription, music sound clip, or other product, and/or share personal information with other users As described in the illustrative embodiment above, once a user has entered the required digits and presses the send key on their mobile phone, the requested product information is automatically sent to the user without any need for the user to hear a ring tone or for the call to "connect" or be answered in the traditional manner of a typical voice call. The act of dialing the digits and pressing send is all that is needed to process the users' request.

Moreover, the illustrative embodiment of the disclosed system may operate without making a voice call, but instead using part of the SS7 signaling channel the phone system normally used for call setup and call tear-down. In the disclosed system, the switching center 16 recognizes the call as a data request call, as opposed to a voice call, in response to the prefix code within the series of digits entered by the user. The switching center 16 makes this determination in part based on the inclusion of a non-numeric/alphabetical digits such as the * key or the # key, preceding the prefix code. Using this or some other specific format, the dialed digits entered by the user are divided into two parts: an addressing section, referred to as the prefix code or prefix part, for example beginning with a predetermined non-numeric/alphabetical digit such as * or #, followed by some number of digits, for example up to 12 digits, referred to as the data code or advertiser code, and representing the coded request from the user for specific associated product information.

System Extensions

Various additional enhancements may be provided with regard to the disclosed system. For example, an extension of the disclosed technology enables the remote control of cable television set top boxes to be used to enter digit strings including the predetermined prefix code and data code used as described above, in order to determine product information that is to be delivered to the user. Using such an embodiment, a user watching television could respond to an advertisement by simply pushing keys on their remote control, and the set top box would send the request message upstream to the cable company, where a server operates to provide the product information to the user, for example through an e-mail message.

In another embodiment, the disclosed system can support voting or polling, for example by enabling the user to dial first predetermined digit string, such as #NBC™-1, for Yes, and a second predetermined digit string, such as #NBC™-2, for No in response to a poll, or to enter a vote. Similarly, another predetermined string, such as #CBS™-3 could be used to indicate selection of answer #3 in a multiple choice answer question in response to TV or Radio poll questions. The disclosed system does not require the user to dial an 800 number, or get up from the TV and go to a PC with Web access. Additionally, the disclosed system does not require an SMS text message or WAP interface on the user's phone in order for the user to participate in a vote.

Other applications of the disclosed system will also be apparent to those skilled in the art. For example, the prefix code portion of the dialed digits may indicate a variety of services other than requesting product information delivery. For example, the below prefix codes, which correspond to keypad characters also indicative of the type of information requested, could be used to request other kinds of information when entered into a mobile phone:

| #200 | (#C00) | Request a user's contact information |
| #400 | (#I00) | Request Additional Product Information |
| #600 | (#M00) | Request Restaurant Menus |
| #700 | (#R00) | Request Article Reprints |
| #730 | (#RE0) | Request Info on Real Estate |
| #800 | (#V00) | Participate in a Poll or Vote |
| #900 | | Request Product Information inside Store |
| #768 | (#PMT) | POS (Point of Sale) Payment in Stores |

The above #XXX format prefix codes are given for purposes of explanation only, and the disclosed system is not limited to such an embodiment. For example, the different services that may be provided through the disclosed system do not have to be distinguished by different prefix codes, but may alternatively be distinguished by the value of the data code. Moreover, the specific services given above for purposes of explanation are not to be considered an exhaustive list of the services that may be provided using the disclosed system. Other services, such as subscription services regarding magazines, or credit card requests, and/or special document requests for documents such as tax forms or other legal forms, requests for stock quotes, annual or quarterly reports, or other financial information, are also examples of services that may also or alternatively be provided using the disclosed system.

System Advantages

The disclosed system provides many advantages over prior systems. From an advertiser's standpoint, the disclosed system provides highly valuable marketing techniques and data gathering capabilities. For instance, the disclosed system may provide the ability to accurately monitor overall effectiveness of outside advertising. Additionally, the disclosed system promotes true interactivity with traditional advertisements without requiring special mobile interfaces/protocols such as WAP, SMS or iMode. Accordingly, every mobile phone user can use the disclosed system. This is in contrast to WAP or SMS based systems which require a particular type of handset, specific knowledge of an interface that is different on every phone, and that may require explicit activation or subscription by the user.

Another advantage of the disclosed system is its ability to track the activities of and continue to market to a registered consumer. The disclosed user accounts can be used to automatically collect, process and catalog all consumer transaction data. Such collected data may then be made available in real-time via a web based data portal that can be securely accessed by an advertiser or their agency.

Another possible extension enables users to share personal and/or business information. A predetermined prefix code, for example #200, may be entered by a user that desires to share their personal and business contact information with other individuals. In such an embodiment, any user that chooses to store their contact information in their user account can make it available to other users with whom they share their access code. For example, if a user stores their contact information in their user account, another user could simply ask them for their personal contact access code, which would serve as the data code portion of the dialed digits when the disclosed system is accessed via mobile phone. Accordingly entering the predetermined prefix code followed by the personal contact access code (i.e. as a dialed digit string of #2004567, where #200 is the predetermined prefix code and 4567 is the access code) into a cell phone, and then hitting "send", would cause the disclosed system to send an electronic mail message to the caller including the contact information for the user identified by the personal contact access code 4567.

Another predetermined prefix code may be used to cause the disclosed system to provide reprints of articles. For example, the prefix code #700 may be used to request a reprint of an article identified by the contents of the data code dialed. In this way, magazines, newspapers and other periodicals can provide "re-prints" for a fee to individuals interested in additional copies of articles. Utilizing this feature of the disclosed system, periodicals can label each articles with a specific data code (i.e. 345), catalog the list of data codes and articles on a database accessible to the disclosed system, and offer them for a fee to mobile phone users who would like a copy sent to their e-mail address.

Those skilled in the art should further appreciate that programs defining the functions of the disclosed system and method can be implemented in software and delivered to a system for execution in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the illustrative embodiments may be implemented in computer software, the functions within the illustrative embodiments may alternatively be embodied in part or in whole using hardware components such as Application Specific Integrated Circuits, Field Programmable Gate Arrays, or other hardware, or in some combination of hardware components and software components.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

What is claimed is:

1. A method for fulfilling a service requested via a communication device, the method comprising:
configuring at least one rule for service fulfillment of a data code;
receiving, by a call-switching system from the communication device, a dialed digit string comprising a non-numeric prefix code and the data code in a call;
suspending the call and recognizing, by the call-switching system, the prefix code in the dialed digit string, and in response, (i) translating the prefix code into a destination address of a service control point (SCP) and (ii) communicating, based on the destination address, a request message comprising the dialed digit string to the SCP which in turn forwards the request message to a service processing-system associated with the SCP;
following receipt by the service-processing system of the request message, identifying the data code contained therein;
looking up, by the service-processing system in a stored database, the at least one rule for service fulfillment based on the data code; and
if the service processing system determines the data code is valid, providing service fulfillment, by the service-processing system, based on the at least one rule;
otherwise, transmitting by the service processing system via the SCP to the call-switching system a command configured to cause the call-switching system to continue translate the prefix code and resume the call processing.

2. The method of claim 1, wherein the at least one rule specifies a service delivery method.

3. The method of claim 1, wherein the at least one rule specifies sending a voice signal to a communication device.

4. The method of claim 1, wherein the at least one rule specifies transmitting an SMS text message to a communication device.

5. The method of claim 1, wherein the at least one rule specifies transmitting contact information of a user to a communication device.

6. The method of claim 1, wherein the at least one rule specifies transmitting a wireless application protocol push to a communication device.

7. A system for fulfilling a service requested via a communication device, comprising:
(a) a call-switching system comprising:
a memory for storing a non-numeric prefix code and, corresponding thereto, a destination point-code address of a service-processing system;
a communication device interface for receiving, from the communication device, a dialed digit string comprising the prefix code and a data code in a call connection;
a processor configured to suspend the call recognize the prefix code in the dialed digit string, and in response, (i) access the memory to translate the prefix code into the destination point-code address of a service control point (SCP) and (ii) transmit a request message comprising the dialed digit string to the SCP which in turn forwards the request message to a service processing-system associated with the SCP at the destination point-code address;
(b) a service-processing system comprising:
a database for storing records each comprising (i) a data code and (ii) a reconfigurable field specifying at least one rule for service fulfillment upon receipt of the data code; and
a processor configured to (i) identify the data code contained within the request message received from the SCP, (ii) query the database for at least one rule for service fulfillment based on the data code, and (iii) if the service processing system determines the data code is valid, resume the call and provide service fulfillment based on the least one rule, and
(iii) if the service processing system determines the data code is invalid,
transmit via the SCP to the call-switching system a command configured to cause the call-switching system to continue translate the prefix code and resume the call processing.

8. The system of claim 7, wherein the at least one rule specifies a service delivery method.

9. The system of claim 7, wherein the at least one rule specifies sending a voice signal to a communication device.

10. The system of claim 7, wherein the at least one rule specifies transmitting an SMS text message to a communication device.

11. The system of claim 7, wherein the at least one rule specifies transmitting contact information of a user to a communication device.

12. The system of claim 7, wherein the at least one rule specifies transmitting a wireless application protocol push to a communication device.

* * * * *